Feb. 21, 1950 W. DALZIEL ET AL 2,498,071
MEANS FOR STACKING ARTICLES INTO LAYERS
Filed Dec. 20, 1947 6 Sheets-Sheet 3

Fig. 6.

Inventors
WILLIAM DALZIEL
JOHN WILLIAM GRAY

Campbell, Brumbaugh & Free
ATTORNEYS

Fig. 13.

Patented Feb. 21, 1950

UNITED STATES PATENT OFFICE 2,498,071

MEANS FOR STACKING ARTICLES INTO LAYERS

William Dalziel and John William Gray, Bebington, England, assignors to Lever Brothers Company, Cambridge, Mass., a corporation of Maine Application December 20, 1947, Serial No. 792,986
In Great Britain September 19, 1946

Section 1, Public Law 690, August 8, 1946
Patent expires September 19, 1966

12 Claims. (Cl. 214—6)

This invention relates to methods of and means for stacking articles into layers and also to means for automatically packing into containers the layers of articles stacked by said methods and means.

The invention has for its object the provision of a method of stacking articles into layers by forming rows of articles and stacking the rows when formed into a layer, the provision of apparatus for carrying out this method of stacking and also for automatically packing articles in layers into containers.

In accordance with the present invention there is provided a method of stacking articles into layers by forming rows of articles and stacking the rows when formed into a layer, said method comprising the steps of assembling a row of said articles on a portion of a slotted platform, moving a slotted carrier through said platform to raise the rows of articles already stacked on another portion thereof and to insert an assembled row beneath said raised rows.

The term "row" is usually used to signify a number of articles placed adjacent one another. For the purposes of this specification, however, the term "row" is to be taken to include a single article as well as a number of adjacent articles. If the row consists of one article, the "layer" formed by the method and apparatus, hereinafter mentioned, will of course be only one article wide. Thus the invention can be applied to the assembly of what would usually be termed a row of articles from single articles, and such an assembly is to be understood to be included in such expressions as "the assembly of a layer of articles from rows of articles" for the purpose of this specification. Furthermore in referring to "rows," the singular is to include the plural and vice-versa where the context so admits.

The invention also provides stacking apparatus which comprises a fixed slotted platform; a slotted carrier movable through said platform; means for assembling a row of articles on a portion of said platform and means for moving said carrier through said platform to raise rows of articles already stacked on another portion thereof and to insert an assembled row beneath said raised rows.

In such apparatus the slotted carrier may be arranged to move first vertically upwards through the platform to raise the rows already stacked thereon and then horizontally to insert the assembled row of articles thereunder. Both vertical and horizontal movements may be imparted to the carrier by a suitable system of levers operated by such means as cams. This system of cams may be so arranged, that in operation, the vertical and horizontal movements follow one another in succession, so that the slotted carrier travels around a rectangular path during the upward vertical traverse of which it raises the already stacked rows and during the upper horizontal traverse of which it inserts the assembled row of articles thereunder. The carrier may comprise a step having a floor, tread and riser all of which are slotted, the end of the bars forming the floor of the carrier being bent upwards through a right angle to form a series of vertical bars parallel to the riser. On vertical movement being imparted to the carrier the tread is arranged to raise the already stacked rows to a height above the platform at least sufficient for the insertion of a new row underneath. On horizontal movement being imparted to the carrier this tread is arranged to be withdrawn from underneath the raised rows at the same time as the newly assembled row is inserted thereunder by the floor and vertical bars formed from the floor as above. It is desirable that the tread should not be withdrawn from underneath the raised rows unless a newly assembled row is ready for insertion. Otherwise the lifted row will drop back on to the floor of the carrier. Similarly an assembled row should not be inserted under the raised rows unless it is correctly aligned for insertion as otherwise damage to the articles or jamming of the apparatus may occur. Therefore it is desirable to provide a form of trip mechanism serving, unless operated by the completion of a row, to arrest the above mentioned vertical movement of the carrier until the assembled row is completed and in position for insertion. If such a trip mechanism is arranged to arrest the vertical movement of the carrier until completion of a row the sequence of operations is: assembly of a row—on completion of a row, but not until then, vertical movement of the carrier—then horizontal movement of the carrier. The subsequent motion of the carrier should then be vertically downwards to deposit the already stacked articles, with the new row added underneath, back on the platform.

In a preferred embodiment of the invention where the carrier comprises a slotted step having a tread, riser and a floor having its end bent up to form a series of vertical bars, particularly simple means for achieving the desired operations are possible. The carrier in this case, for example by means of a cam and lever mechanism, is reciprocated horizontally between two stations, located beneath the platform with periods of rest at each station and this kind of reciprocatory motion continues whether or not a row of articles is assembled for stacking; that is the carrier is allowed to idle beneath the platform. One of these stations is so located beneath the platform, that when the carrier is at this station the tread of its step is vertically below that portion of the platform carrying the already stacked rows. The trip mechanism above mentioned serves, when operated by the completion of a row, to put into operation means for giving the carrier vertical motion when next it returns to said station. The arrangement is such that when the trip operates, the carrier after arrival at said station, rises through the platform to lift the previously stacked rows with its tread, moves horizontally to insert the new row with its floor and vertical bars, moves downward to the other station below the platform level and then horizontally to the first mentioned station for the next lifting movement. If by that time a new row of articles has been completed the trip operates and the carrier again moves through the above described rectangular path. If the row has not been completed, only horizontal movement of the carrier between the two stations takes place below the platform.

Various ways in which the apparatus according to the invention may be constructed will be described in more detail hereinafter.

The invention has particular application to, and provides novel means for the packing of articles in layers into containers. Cartons from a filling or wrapping machine are normally packed by hand in layers into containers for transport, a process which is wasteful in labour and also leads to fatigue in the packers.

In accordance with another aspect of the present invention there is provided stacking apparatus which comprises a fixed slotted platform; a slotted carrier movable through said platform; means for assembling a row of articles on a portion of said platform; means for moving said carrier through said platform to raise rows of articles already stacked on another portion thereof and to insert an assembled row beneath said raised rows; inserting means for inserting the layer formed by said stacked articles into a container; and means for causing said inserting means to operate only on completion of a layer.

For the purpose of facilitating the description in this specification the terms "horizontal" and "vertical" are used to describe the orientation of the rows and layers relative to one another. It is not intended, however, that the use of these terms necessarily implies in practice any specific orientation in space of the apparatus or movements.

In a preferred arrangement of the invention in this aspect, particularly applicable to the packing of rectangular cartons or packets, the packets are fed one by one, by an endless belt on to a fixed slotted platform. On completion of a row, a stepped and slotted carrier moves upwards through the slots of the platform carrying with it, on its lower tread, the row of packets. The carrier then moves sideways and downwards whereby the row is transferred to another portion of the platform on which the layer is to be built. A second row is built up and on its completion the carrier again moves as before. The tread of the carrier, when the carrier moves upwards lifts the first row, so as to permit the second row to be deposited beneath it. On completion of a third row, the layer consisting of the first two rows is again lifted to permit the insertion of the third row beneath it to form a three-row layer. Every time a row is completed it is thus added to the layer and successive additions of rows eventually complete the layer. On completion of a layer two or more pusher plates push the completed layer bodily into the magazine carrying the container to be packed. Successive insertions of layers fills the magazine and subsequent insertions fill the container whilst at the same time pushing it off the magazine. The insertion of the last layer into the container pushes the container free of the magazine over which another container is then fitted without interrupting the assembly of rows or building up of layers.

A preferred embodiment of the apparatus according to the invention designed for packing rectangular packets will now be described by way of illustration with reference to the accompanying drawings in which:

Fig. 8 is an end view of an arrangement for carrying out in practice the principles illustrated by the mechanism represented diagrammatically in Figs. 2 to 7;

Figures 1, 10, 11:
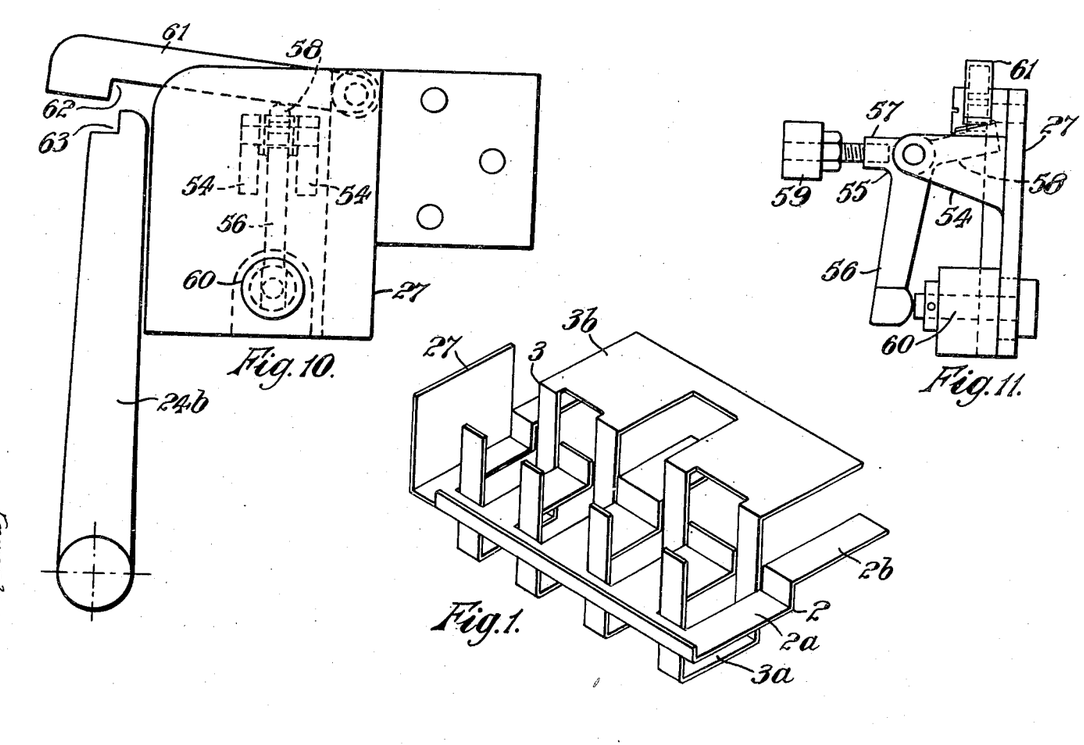
Fig. 1 is a perspective view of a stepped slotted platform with a stepped slotted carrier shown half way therethrough.
Figs. 10 and 11 are enlarged side and end views respectively of a part of the arrangement of Figs. 8 and 9.
Figures 2, 3, 4, 5, 7:
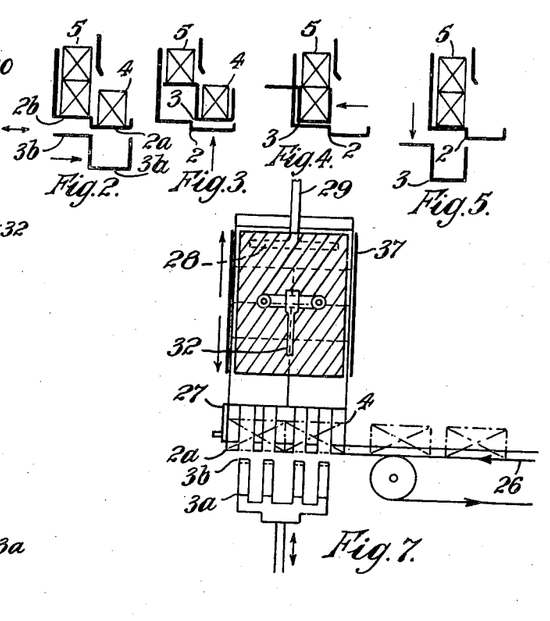
Figs. 2 to 5 are diagrammatic representations in section illustrating the relative positions of platform and carrier at various stages during the cycle of operations of the latter.
Fig. 7 is a diagrammatic representation of an end view of the same mechanism.

The principle of the method of packing according to the present invention will first be described with reference to the diagrammatic drawings of Figs. 1 and 2–5. The essential parts which effect the stacking are shown in Fig. 1. A stepped platform 2, consisting of a floor 2a and a step 2b constitutes a fixed member on which the row of articles is formed and the layer is built up. This platform 2 is slotted to allow the passage through it of a stepped slotted carrier 3, the tread portion 3b of which passes through the step 2b and the floor portion 3a of which passes through the floor 2a. The bars constituting the part 3a of the carrier are preferably bent up at their ends as shown. In Fig. 1 the carrier 3 is shown half way through the platform 2. How such a device is used for stacking is illustrated by Figs. 2 to 5. Referring to these figures, a row 4 of articles to be stacked is built up on platform floor 2a. Already stacked articles are shown as the layer 5. The carrier 3 is stationed immediaetely below the platform 2 (Fig. 2). When the row 4 is complete the carrier 3 is lifted vertically (Fig. 3); the tread portion 3b lifts the layer 5, and the floor portion 3a raises the row 4 off the floor 2a. The carrier 3 now is moved sideways (Fig. 4) to carry the row 4 under the layer 5, which, being held by suitable guides, slips off the tread portion 3b on the new row 4 being added to it. The carrier 3 now moves downwards (Fig. 5), depositing the layer, with the new row stacked underneath it, on to the platform step 2b. The carrier 3 now returns sideways to a position beneath the platform 2 (Fig. 2) and the cycle of operations is repeated.

Figure 6:
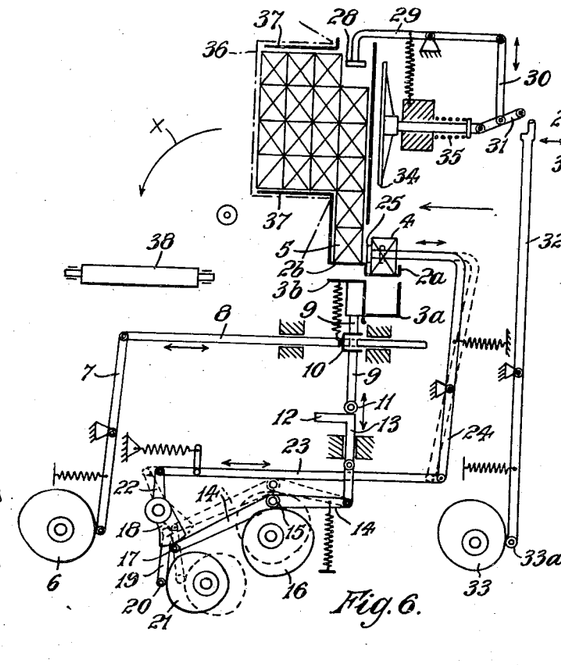
Fig. 6 is a diagrammatic representation of a side view of a mechanism for imparting said cycle of operations to the carrier.

A mechanism for performing these operations is shown diagrammatically in Figs. 6 and 7. Referring to these drawings, the carrier 3 has imparted to it horizontal motion from a cam 6, and levers 7 and 8. The carrier itself is mounted on a rod 9 slidably mounted in a lower carrier 10 carried by the lever 8. The rod 9 terminates in a roller 11 running on a horizontal slide 12 forming an extension at the top of a vertically sliding member 13.

To the bottom of member 13 is pivoted an arm 14 carrying in its middle portion a cam follower 15 running against a cam 16. The other end of arm 14 carries a roller 17 which runs against a radius plate 18. This plate 18 carries an arm 19 terminating in a cam follower 20 running against a cam 21. Fixed to the radius plate is an arm 22 connected through levers 23 and 24 to a trip 25, to be described in more detail later.

The operation is as follows: packets are fed by a belt 26 (Fig. 7) on to the floor 2a. Before a row is complete (the row in the example illustrated consisting of two packets), that is before the first packet of the row has reached a stop plate 27 at the far end of floor 2a, the trip 25 is free, and the levers 24 and 23 can take up the position shown in dotted lines. This motion is imparted to these members as cam follower 20 rides over the lesser radius of cam 21. At the same time radius plate 18 moves into the position shown dotted. When, however, a row of packets is in the position ready to be stacked as shown by the dotted lines in Fig. 7, the trip 25 is prevented from moving and the levers 24 and 23 and the arm 22, radius plate 18 and arm 19 are kept in the position shown by the full lines, the cam follower 20 leaving the cam 21. Rotation of the cam 16 lifts cam follower 15, and the arm 14 pivots about roller 17 (which moves a little round the outer radius of the radius plate 18): the sliding member 13 is moved vertically upwards, lifting the carrier 3 into the position shown in Fig. 3. The rotation of the cam 6 now moves the lower carrier 10 to the left in the figure to bring the carrier 3 into the position of Fig. 4. Cam 16 now allows the arm 14, and with it the carrier 3 to drop to the position of Fig. 5. Finally cam 6 brings back the carrier 3 to the position shown in Fig. 6 and Fig. 2.

In the event, however, that when cam 16 begins to lift the arm 14, the row is not completed, the movement of the parts connected to trip 25 will have displaced the radius plate 18, as its cam follower 20 follows cam 21, into the position shown in dotted lines. This displacement of radius plate 18 against which the roller 17 abuts allows this roller to pass up one side of the radius plate; arm 14 therefore pivots about its end which is connected to member 13.

Thus, if a row is incomplete at the time the carrier is at the station shown in Fig. 6, no vertical movement is given to the carrier 3, but only horizontal movement due to cam 6, and the carrier moves from the position or station of Fig. 2 to that of Fig. 5, the movement round the rectangular path through the positions of Figs. 3 and 4 being omitted. Thus it is not possible for the machine to perform a stacking movement unless a row is complete at the moment when the mechanism is in the position indicated in the full lines in Fig. 6. The arrangement thus prevents jamming, and the drive of the machine can continue independently of the rate of feed of the articles by the belt 26.

The apparatus also comprises means for feeding the layers, as they are completed by the addition of successive rows, into cartons.

The layer 5 is stacked in front of the open entry end of a magazine 37. The completion of a layer raises a layer plate 28 which through levers 29 and 30 lowers an arm 31 to connect with the end of a lever 32. When this connection is made, the lever 32, which is oscillated by cam 33, moves a plate 34 against a spring 35 to push the top part of the layer into the magazine 37. Over the magazine 37 is a carton 36, into which the packets are to be loaded. When the magazine is full, the entry of further layers pushes the carton off the magazine. The carton, when full, falls in the direction of the arrow X on to a roller conveyor 38. A new carton is fitted over the magazine 37 automatically by any suitable means (not shown) or by hand before a new layer is pushed forward. The removal of a layer into the magazine 37 causes the plate 28 to fall, and to free the lever 32 from the plate. The lever 32 moves freely until the next layer is completed.

An arrangement for carrying out in practice the principles described above is shown in Figs. 8 to 13. Parts in these figures corresponding to parts already described are given the same reference numerals.

Figure 9:
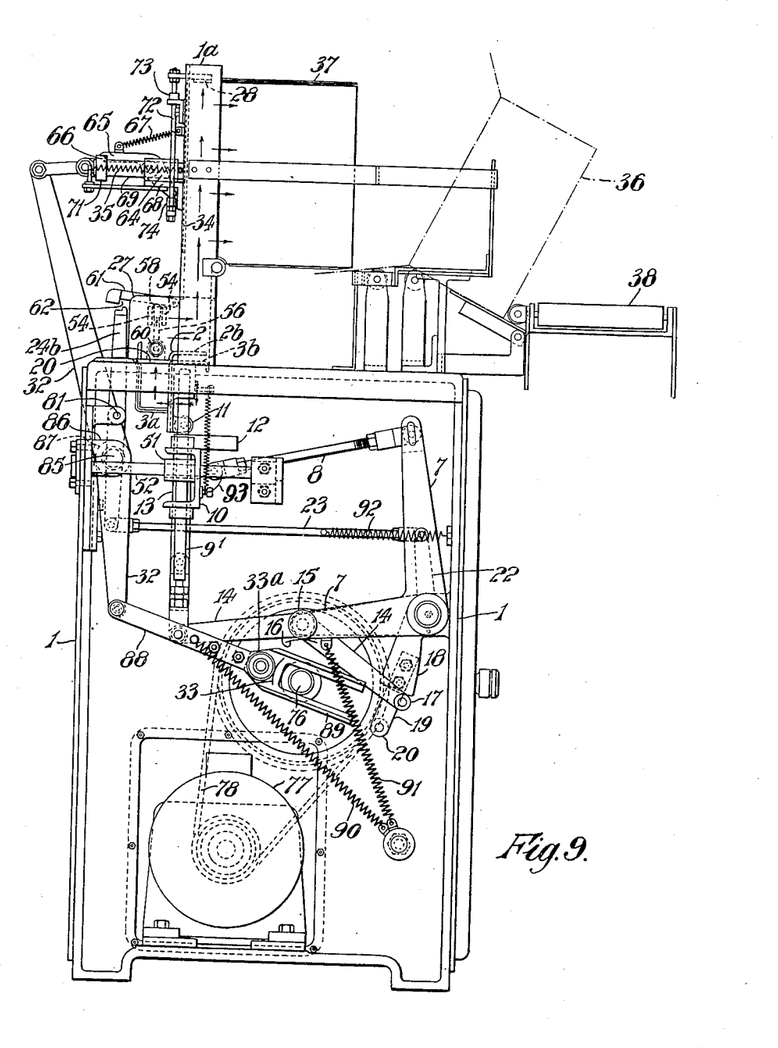
Fig. 9 is a side view of the arrangement of Fig. 8.

Referring first to Figs. 8 and 9 which show a general arrangement of the machine in end and side view respectively, the packets to be stacked are fed by a belt 26 onto the slotted platform floor 2a as already described. The carrier 3 consists of a slotted stepped framework, the floor and tread carrying portions of which are marked 3a and 3b as before. The carrier 3 carries two vertical guide members 9' which pass through bushes 50 in the lower carrier 10.

The lower carrier 10 also carries two further bushes 51 through which pass fixed horizontal guides 52, and along which the lower carrier 10 can slide horizontally. The central portion of the carrier 10 between the two sets of bushes 51 and guides 52 is open and permits the unobstructed passage through it of the vertical member 13 ending in the horizontal slide 12. The carrier 3 rests on this slide and is provided with a roller 11 which runs over the slide.

It will be seen therefore that horizontal movement of the lower carrier 10 also imparts horizontal movement to the carrier 3 through the vertical guide members 9' carried in the bushes 50. If the vertical member 13 carrying the horizontal slide 12 is lifted, the carrier 3 is lifted, the guide members 9' sliding through the bushes 50. The arrangement is therefore mechanically equivalent to the arrangement of parts 9, 10, 11, 12 and 13 shown in Fig. 6 already described, though the relative arrangement of these parts is different from that shown in Figs. 8 and 9. The roller 11 carried by the carrier 3 is spring loaded against the horizontal slide 12 by springs 53.

In the description of Fig. 6, reference was made to a trip mechanism 25, though this was not described in detail. The mechanism in question is indicated more fully in Figs. 8 and 9, and in larger detail in Figs. 10 and 11. Referring to these figures, behind the stop plate 27 are fitted brackets 54 on which is pivoted an arm 55 having three portions 56, 57 and 58. The portion 57 carries a weight 59, which presses the portion 56 lightly against a plunger 60 passing slidably through the stop plate 27. The portion 58 presses upwards against a trip lever 61 having a notch 62 which is adapted to fit a notch 63 in the upper part of the trip lever arm 24b. The weight 59 is sufficient just to keep the trip lever in the raised position as shown. When a packet abuts against the stop plate 27, the plunger 60 is moved to the left in Fig. 11, and this movement, through the arm 55, lowers the trip lever 61 to engage and hold the lever 24b.

Returning to Figs. 8 and 9, the mechanism for inserting a layer of packets stacked on the platform step 2b into magazine 37 is shown. This mechanism comprises a plate 34, carrying a bracket 64 on which is pivoted a catch 65, having a notch 66. The catch is spring loaded by a spring 67 fixed to the plate 34. A bracket 68 attached to the upper part 1a of the frame 1 of the machine carries two fixed slides 69 on which slides a cross member 70 provided with slide bushes 71. The layer when complete raises a plate 26 which is mounted on two outer vertically sliding rods 72 mounted in bushes 73, and passing through the brackets 68. The lower ends of the rods 72 are joined by a cross rod 74 against which rests the lower end of the catch 65. The cross member 70 is partially connected to the lever 32, corresponding to the same numbered member shown in Fig. 6. While the layer is incomplete, the notch 66 of the catch 65 is raised by spring 67, as the rods 72 and 74 are in their lower positions. The cross member 70 idles along the slides 69 when the lever 32 moves. When the layer is complete, the rods 72 and 74 are raised by the packets lifting the plate 26. Catch 65 now is pushed downward against the spring 67 and the notch 66 engages the cross member 70. Movement of the lever 32 now imparts a thrust to the plate 34 through the cross member 70, catch 65, and bracket 64, and the plate 34 moves to the right in Fig. 9 to insert a layer of packets into the magazine 37. The plate 34, on the return of the arm 32, returns to its original position under the action of the return springs 35 which are connected between the brackets 68 and 64. The catch 65 lifts free from the cross member 70 as the plate 26 falls, so that the plate 34 is not moved again until the completion of a new layer.

The cams for operating the above mechanism are mounted on a common shaft 76, driven from an electric motor 77 through belts 78. The cam and lever mechanism is shown in detail in Figs. 12 and 13. Cam 21 on the left of Fig. 13 contacts cam follower 20 on arm 19 fixed to the radius plate 18. The radius plate 18 is pivoted on the fixed shaft 79, and is fixed through the bush 80 to the lever 22, which is pivoted to the cross lever 23. This lever 23 is loaded by spring 92 and is pivoted to the lever 24a which at its upper end (Figs. 8 and 9) is fixed to the rotatable cross shaft 81, which rotates in suitable fixed bushes (not shown). This shaft also carries the lever arm 24b which rises to the trip mechanism already described with reference to Figs. 10 and 11.

Returning to Figs. 12 and 13, cam 16 on shaft 76 contacts cam follower 15 on the arm 82 which is spring loaded by spring 91 and which pivots at its other end about shaft 79 on a bush 83. The end of shaft 82 carrying the cam follower 15 also has pivoted to it the centre point of the arm 14. One end of this arm carries the roller 17 which runs against the radius plate 18. The other end carries the vertical member 13 terminating at its upper end in the horizontal slide 12.

Figure 12:
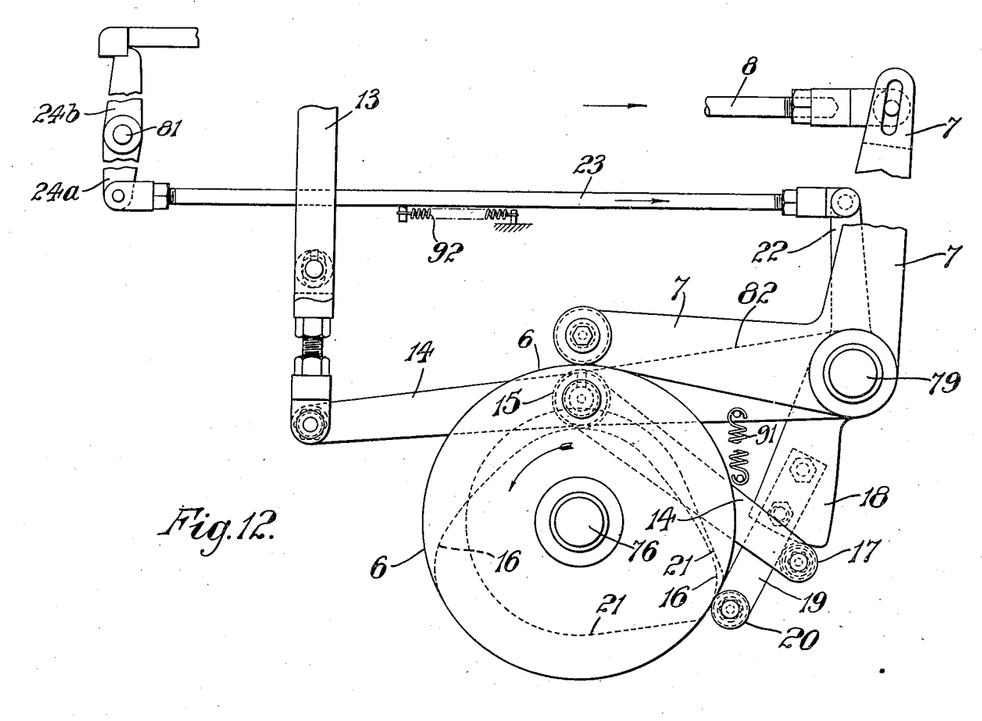
Figs. 12 and 13 are enlarged side and plan views respectively of another part of the arrangement of Figs. 8 and 9.
Figure 13:
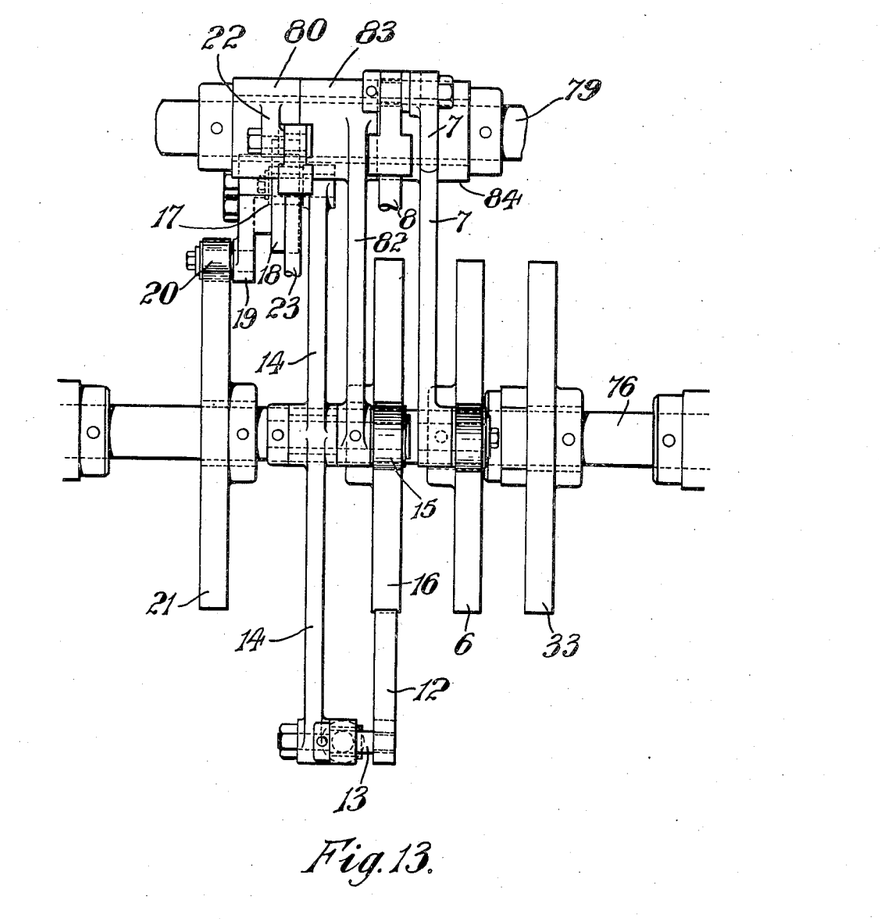

The cam 6 contacts the cam follower on the bent lever 7 which is pivoted on the shaft 79 through the bush 84. The upper part of lever 7 carries the lever 8, which is pivoted to a bracket 93 on the back of the lower carrier 10. This system imparts the horizontal movement to the carriers 10 and 3.

The mechanism for effecting insertion of the layer into the magazine 37 is shown in Figs. 8 and 9. The lever 32 is pivoted at its centre on a fixed shaft 85, which in Fig. 8 for the sake of simplifying the drawing is shown in part only. In Fig. 9 a bracket 86 is shown for this shaft fixed to the main frame 1 of the machine. The upper and lower portions of lever 32 are connected together through a bush 87 to which they are both attached. The lower end of lever 32 is pivoted to a member 88 (Fig. 9) terminating in a fork 89 which embraces the shaft 76 which acts as a guide. The fork 89 carries a cam follower 33a contacting a cam 33 (only a portion of the radius of which is shown in Fig. 9). The fork has attached to it a spring 90 keeping the cam follower 33a against the cam 33. The rotation of cam 33 imparts oscillation about shaft 85 to the upper portion of lever 32 through cam follower 33a, member 88 and lower portion of lever 32. This oscillation of the upper portion of lever 32 is utilised to insert layers of stacked articles into the magazine 37 in the manner already described.

The operation of the mechanism described in connection with Figures 8 to 13 follows the principles already mentioned in the description of Figure 6, but may here again be briefly set out. The operation of the cam mechanism can most readily be seen from Figure 12. In the absence of any packets to be stacked, or if a row is incomplete at the time the mechanism is in the position shown in Figure 12, lever 24 is free to oscillate, and hence the cam follower 20 follows the contour of cam 21 as the latter rotates, and the radius plate 18 thus moves to the left in the figure. The simultaneous rotation of cam 16 begins to raise the cam follower 15, and as the radius plate 18 has moved to the left, the movement of cam follower 15 causes the arm 14 to pivot about its left hand end and the roller 17 moves upwards behind the radius plate 18. Thus no vertical movement is imparted to the vertical member 13. At the same time the cam 6 has caused the arm 7 to be raised, thereby imparting a movement to the lower carrier 10 towards the right hand side of Figure 9. Continuation of rotation of the shaft 76 brings the mechanism back to the position shown in Figure 12. If by now a row of articles has been assembled on the platform 2, the trip lever 61 will have dropped, and as the arm 24b returns to the position shown in Figure 12, it will be caught. Further rotation of cam 21 will, in this case, not result in a corresponding following movement by the cam follower 20, and radius plate 18 will remain in the position shown in the figure. Therefore, as cam follower 15 is lifted, the arm 14 will pivot about the roller 17 and a lifting movement will be given to the vertical member 13, to raise the carrier 3. When this vertical movement is finished, horizontal movement of the carrier will commence under the action of cam 6 and arms 7 and 8. The new row will now be stacked under the preceding rows. Cam 16 will now permit the member 13 and the carrier 3 to drop and at the end of this movement cam 6 will return the lower carrier 10 to the position shown in Figure 9. If the last stacking operation has completed the layer, the insertion of the layer into the magazine 37 will take place during the return movement of the carrier 10. It will be seen that completion of a row after the moment when the lever 24b has moved to the right, so that it cannot be caught by the trip lever 61, cannot result in a stacking movement until the shaft 76 has brought the mechanism back into the position shown in Figure 12, and thus it is impossible for the carrier 3 to have imparted to it a vertical movement except when it is immediately under the platform 2, that is in the position shown in Figures 2, 6 and 9.

In the above arrangement it is not essential that the platform 2 should consist of the floor 2a and the step 2b. It may consist of a flat slotted plate on one part of which the row of articles 4 is assembled and on another part of which the layer 5 is built up.

The whole apparatus may be small in dimensions and mounted in close proximity to the wrapping or filling machine. It may be fitted with additional devices such as a mechanical or electrical counter for counting either the packets and the like or the containers filled or both. It may also be fitted, if desired, with a ploughing device to raise the point of one end fold of the wrapper on one row of packets in each layer so that the front packet of any given layer may be readily removed.

The invention is not limited to the particular arrangements described above and many alternative arrangements are possible within the scope of the present invention, as will be apparent to those skilled in the art.

For example, a compressed air mechanism may replace the mechanically operated trip mechanisms illustrated in Fig. 6 by the levers 24 and 32 and their concomitant parts. Such compressed air mechanisms may be operated by lightly loaded press buttons or pads arranged to be depressed by completion of a row or layer to release compressed air into a cylinder, the piston of which operates the levers 24 and 32, which may be quite short, to effect release of the stacking or inserting means.

An electrical circuit operating a solenoid or like device may also perform the same function; in this case the trips operated by the completed row or layer may be in the form of electrical switches, or beams of light energising photoelectric cells in well known manner.

The use of special attachments fitted to the apparatus is also envisaged in the invention for packing articles of shapes other than rectangular. Further, where it is desired to use the apparatus in other orientations to that described (for example in an arrangement where Fig. 6 represents a plan view) any necessary guides or spring loading means may be incorporated to ensure satisfactory operation of the apparatus.

We claim:

1. Stacking apparatus which comprises a fixed slotted platform; a slotted carrier movable through said platform; means for assembling a row of articles on a portion of said platform; and means for moving said carrier through said platform to raise rows of articles already stacked on another portion thereof and to insert an assembled row beneath said raised rows.

2. Stacking apparatus which comprises a fixed slotted platform; a slotted carrier movable through said platform; means for assembling a row of articles on a portion of said platform; means for moving said carrier vertically upwards through said platform to raise rows of articles already stacked on another portion of said platform and for withdrawing said carrier horizontally from underneath said raised rows to insert the assembled row thereunder.

3. Stacking apparatus which comprises a fixed slotted platform; a slotted carrier movable through said platform; means for assembling a row of articles on a portion of said platform; means for moving said carrier through said platform to raise rows of articles already stacked on another portion thereof and to insert an assembled row beneath said raised rows; inserting means for inserting the layer formed by said stacked articles into a magazine; and means for causing said inserting means to operate only on completion of a layer.

4. Stacking apparatus which comprises a fixed slotted platform; a slotted carrier movable through said platform; means for assembling a row of articles on a portion of said platform; means for moving said carrier through said platform to raise rows of articles already stacked on another portion thereof and to insert an assembled row beneath said raised rows; a fixed magazine open at both ends and adapted to have placed over one end thereof a carton to be filled with said articles; inserting means for inserting a layer of said stacked articles into the other end of said magazine; means for causing said inserting means to operate only on completion of a layer.

5. Stacking apparatus which comprises a fixed slotted platform; a slotted carrier movable through said platform; means for assembling a row of articles on a portion of said platform; means for moving a slotted carrier around a rectangular path so arranged that said carrier passes through said platform during its upward vertical traverse of said path to raise rows of articles already stacked on another portion of said platform and withdraws from beneath said raised rows during its upper horizontal traverse of said path to insert the assembled row underneath said raised rows; and means for preventing the carrier from moving vertically upwards through said platform in the event of the assembly of a row of articles being incomplete at the instant the carrier is due so to move.

6. Stacking apparatus which comprises a fixed slotted platform; means for assembling a row of articles on a portion of said platform; a lower carrier reciprocative horizontally between two stations beneath said platform; an upper slotted carrier mounted on said lower carrier so as to partake of the horizontal movement thereof and capable of vertical movement with respect to said lower carrier so as to pass through said platform; means for reciprocating said lower carrier; lifting means, arranged to be operated when said lower carrier is at one of said stations, for raising said upper carrier to raise rows of articles already stacked on another portion of said platform and to insert the assembled row underneath said raised rows, and for lowering said upper carrier when said lower carrier is at the other station; and means for rendering said lifting means inoperative in the event of the assembly of a row of articles being incomplete at the instant the upper carrier is due to be raised by said lifting means.

7. Stacking apparatus which comprises a fixed slotted platform; means for assembling a row of articles on a portion of said platform; a lower carrier reciprocative horizontally between a lifting station and a lowering station, both beneath said platform; means for reciprocating said lower carrier; vertical guide members mounted in said lower carrier and slidable vertically therethrough; a lifting member movable vertically; a horizontal member mounted on said lifting member; a roller in contact with said horizontal member and movable horizontally thereon; an upper slotted carrier movable through said platform and mounted on said roller and said vertical guide members so as to partake of the horizontal movement of the lower carrier and the vertical movement of the lifting member; lifting means for raising and lowering said lifting member when said lower carrier is at said lifting and lowering stations respectively to move said upper carrier through said platform to raise rows of articles already stacked on another portion thereof and to insert the assembled row underneath said raised rows; and means for rendering said lifting means inoperative in the event of the assembly of a row of articles being incomplete when said lower carrier is at said lifting station.

8. Stacking apparatus which comprises a fixed slotted platform; means for assembling a row of articles on a portion of said platform; a slotted carrier, reciprocative horizontally between two stations beneath said platform when the assembly of a row is proceeding, and movable through said platform first vertically upwards from one of said stations then horizontally and finally vertically downwards to the other of said stations; means for reciprocating said carrier horizontally beneath said platform; a member pivotably connected to said carrier at one end and capable of oscillation about this connected end when the assembly of a row is proceeding and about its unconnected end when said unconnected end is prevented from oscillating; means for oscillating said member; and means, arranged to be operated by the completion of the assembly of a row of articles, for preventing the oscillation of said unconnected end to bring about movement of said carrier through said platform to raise a row of articles already stacked on another portion thereof and insert the assembled row beneath the raised already stacked rows.

9. Stacking apparatus which comprises a fixed slotted platform; means for assembling a row of articles on a portion of said platform; a slotted carrier reciprocative horizontally between two stations beneath said platform when the assembly of a row is proceeding and movable through said platform first vertically upwards from one of said stations then horizontally and finally vertically downwards to the other of said stations; means for reciprocating said carrier horizontally beneath said platform; a member pivotably connected to said carrier at one end and capable of oscillation about this connected end when the assembly of a row is proceeding and about its unconnected end when said unconnected end is prevented from oscillating; a stop, capable of being stationed in the path of oscillation of said unconnected end; a trip mechanism, arranged to be operated by the completion of the assembly of a row of articles for stationing said stop in said path, thereby to bring about movement of said carrier through said platform to raise a row of articles already stacked on another portion thereof and insert the assembled row beneath the raised already stacked rows.

10. Stacking apparatus which comprises a fixed slotted platform; means for assembling a row of articles on a portion of said platform; a slotted carrier, reciprocative horizontally between two stations beneath said platform when the assembly of a row is proceeding and movable through said platform first vertically upwards from one of said stations then horizontally and finally vertically downwards to the other of said stations; means for reciprocating said carrier horizontally beneath said platform; a member pivotably connected to said carrier at one end and capable of oscillation about this connected end when the assembly of a row is proceeding and about its unconnected end when that unconnected end is prevented from oscillating; a stop, capable of oscillating across the path of oscillation of said unconnected end when said member oscillates about its connected end and of being stationed in said path to prevent said unconnected end from oscillating; a trip lever, co-operative with said stop; means for causing said stop and trip lever to oscillate; means arranged to be operated by the completion of the assembly of a row of articles for stopping the oscillation of said trip lever so as to station said stop in said path, thereby to bring about movement of said carrier through said platform to raise a row of articles already stacked on another portion thereof and insert the assembled row beneath the raised already stacked rows.

11. Stacking apparatus which comprises a fixed slotted platform; means for assembling a row of articles on a portion of said platform; a stepped slotted carrier movable through said platform; traversing means for imparting reciprocatory horizontal motion to said carrier; lifting means for imparting reciprocatory vertical motion to said carrier, said traversing and lifting means being arranged so that in operation thereof vertical and horizontal movements follow one another in succession; a trip mechanism adapted to be operated by the completion of a row of articles; a connection between said trip mechanism and said lifting means for causing these means to operate only after a row has been completed whereby in operation, on completion of a row, said carrier raises rows of articles already stacked on another portion of said platform and inserts the newly assembled row beneath said raised rows.

12. Stacking apparatus which comprises a fixed slotted platform; means for assembling a row of articles on a portion of said platform; a carrier movable through said platform and comprising a step having a floor, tread and riser, all of which are slotted, and a plurality of vertical bars integral with said floor and parallel to said riser; means for moving said carrier around a rectangular path so arranged that the carrier raises rows of articles already stacked on another portion of said platform during its upward vertical traverse of said path and inserts the assembled rows beneath the raised already stacked rows during its horizontal traverse of said path; and means for preventing said carrier from moving vertically upwards through said platform in the event of the assembly of a row of articles being incomplete at the instant the carrier is due so to move.

WILLIAM DALZIEL.
JOHN WILLIAM GRAY.

REFERENCES CITED

The following references are of record in the file of this patent:

UNITED STATES PATENTS

| Number | Name | Date |
| --- | --- | --- |
| 1,573,024 | Aldrich et al. | Feb. 16, 1926 |